Nov. 11, 1941.                  E. MORLOCK                    2,261,939
           APPARATUS FOR DISTILLING HIGH BOILING POINT LIQUIDS
                    Filed April 21, 1938           2 Sheets-Sheet 1
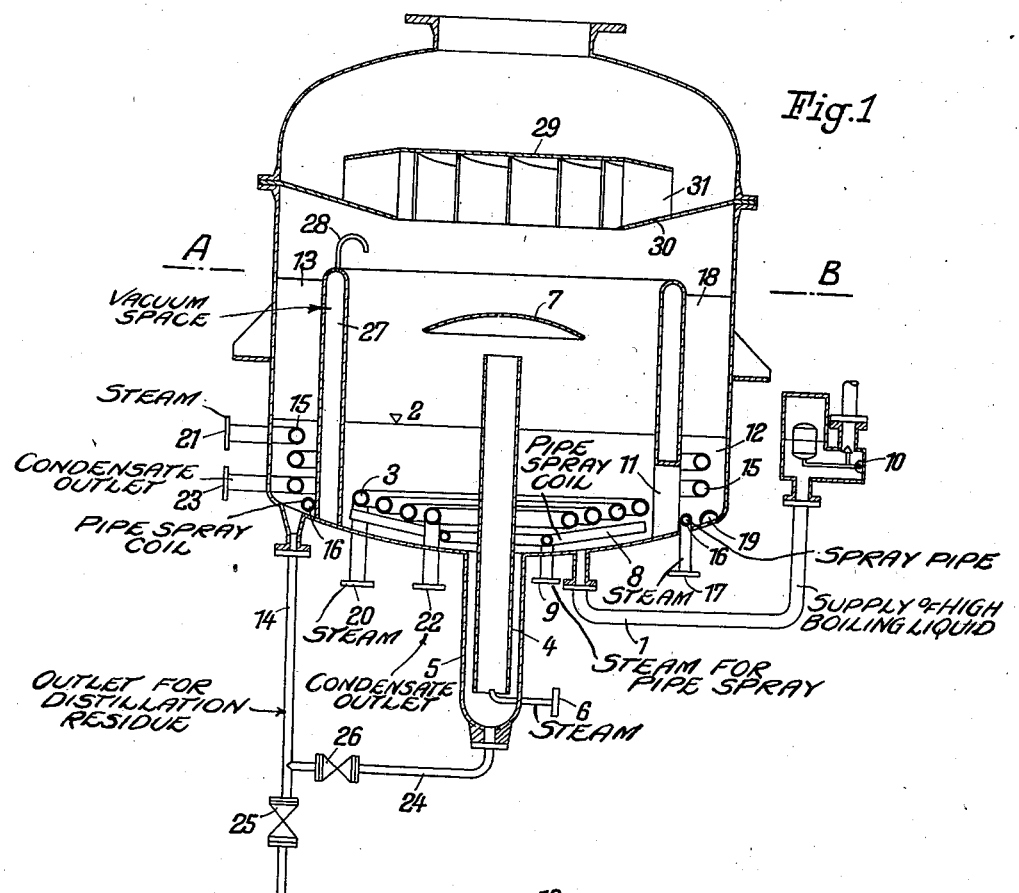
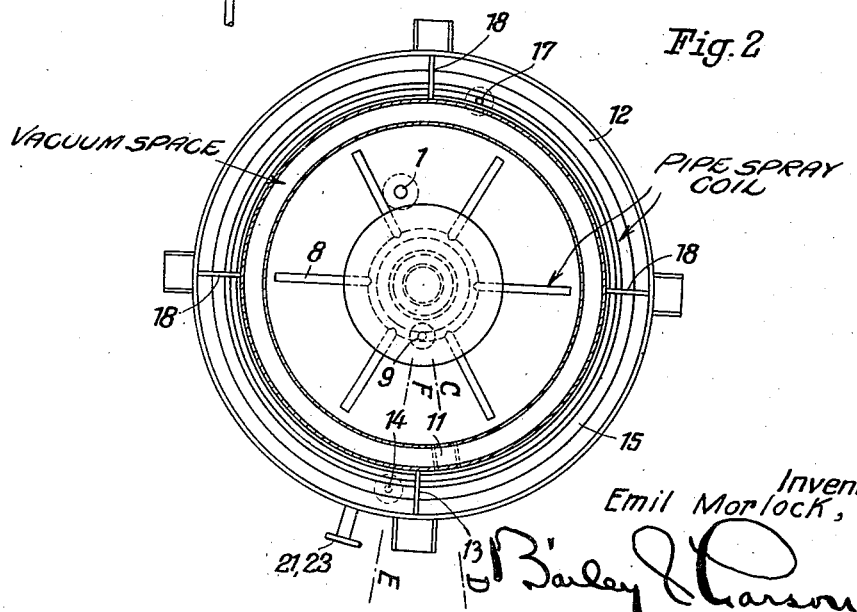
Inventor:
Emil Morlock,
Bailey & Carson
Attorneys

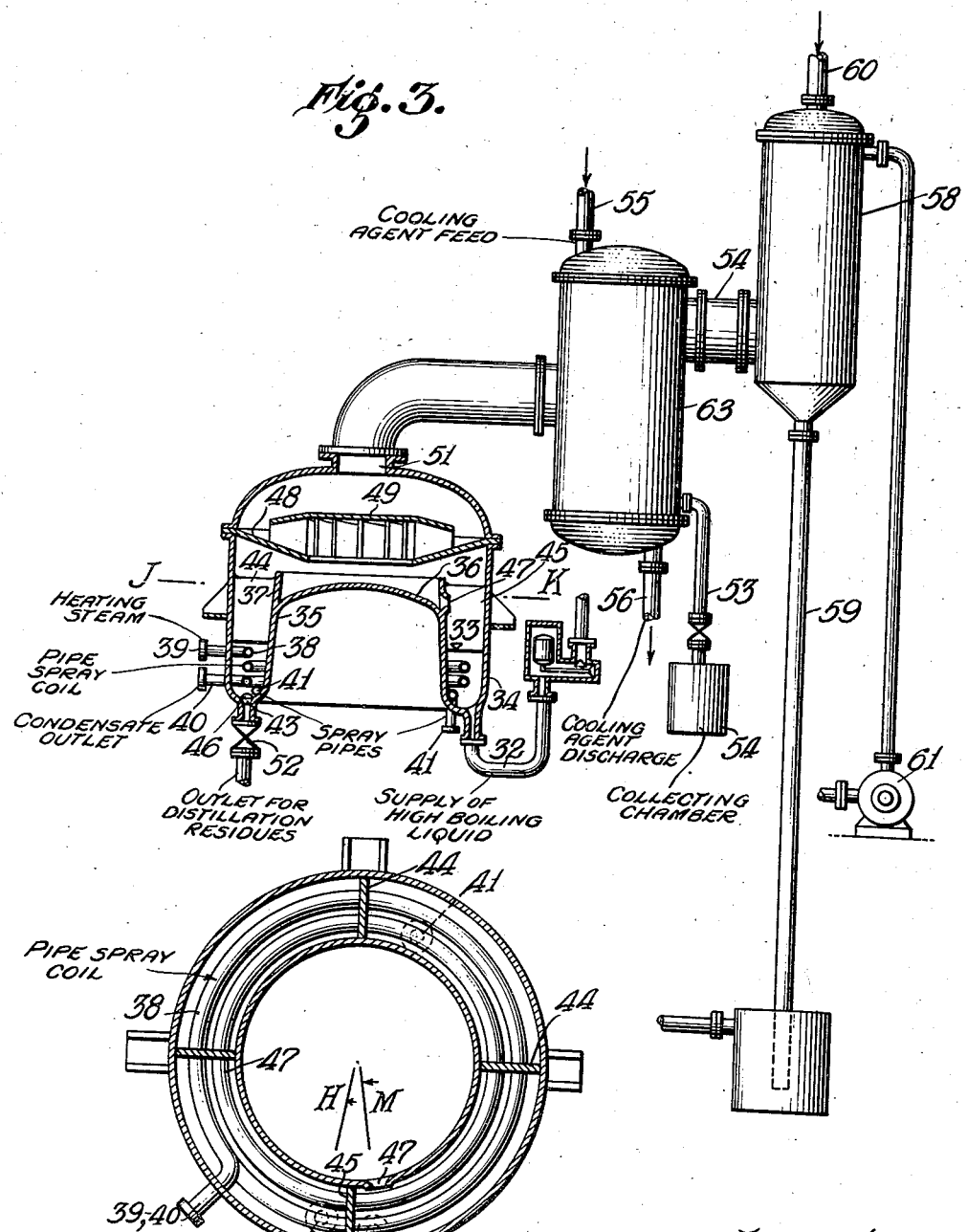

Patented Nov. 11, 1941

2,261,939

UNITED STATES PATENT OFFICE 2,261,939

APPARATUS FOR DISTILLING HIGH BOILING POINT LIQUIDS

Emil Morlock, Frankfort-on-the-Main, Germany, assignor to American Lurgi Corporation, New York, N. Y., a corporation of New York Application April 21, 1938, Serial No. 203,401
In Germany April 26, 1937

4 Claims. (Cl. 202—163)

This invention relates to an apparatus for distilling high boiling point liquids.

In the distillation of high boiling point liquids, such as for example fatty acids, glycerine, high boiling fractions of mineral or synthetic oils or of oils produced by hydrogenation, for example lubricating oil fractions, or the like, as complete as possible a separation of the substances to be distilled from the residue of distillation is usually aimed at. The distillation should also be accomplished rapidly and the liquid should remain only a relatively short time in the distilling vessel, in order to prevent the occurrence of harmful decomposition of the substances treated. In many cases it is also desirable only to have small amounts of liquid in the distilling vessel, and nevertheless to operate the latter with a high throughput.

This aim cannot be achieved with some known distilling apparatus. Other known distilling devices, for example that of application Serial No. 100,117, are certainly utilisable, but are still relatively large and expensive.

The present invention aims at providing a device which will eliminate both disadvantages. To this end, in accordance with the invention, the distilling vessel is divided by a vertical wall, secured to the base of said vessel, for example, into an inner liquid chamber and an outer channel-shaped liquid chamber surrounding the former. The liquid to be distilled is first admitted to the inner liquid chamber, and there subjected to partial distillation. From the inner liquid chamber it passes through an aperture in the wall into the outer liquid chamber. In the latter a partition is disposed. The inlet aperture and the outlet for the distillation residue lie in the proximity of the partition. The inlet aperture is located on one side, and the outlet aperture on the other side of the partition, so that the liquid passing over from the inner liquid chamber into the outer has to flow around the whole length of the outer liquid chamber.

In order that condensate forming in the upper part of the distilling vessel may not disturb the distillation, there are preferably provided, in the vapour chamber of the distilling vessel, guides which cause the condensate to flow back into the inner liquid chamber.

The apparatus of the present invention is relatively simple and inexpensive to make. The wall which divides the distilling vessel into an inner and an outer liquid chamber may be joined to the base of the distilling vessel by simple means, for example by welding. All other apparatus appertaining to the distilling apparatus, such as heating coils, steam sprays, circulating devices, and the like, may be conveniently accommodated in the distilling vessel or its two liquid chambers. In addition, the apparatus of the present invention permits very extensive separation of the substances to be produced by the distillation from the distillation residue, and the distillation takes place in a very short space of time, so that the substances treated are not exposed to injury through too long or too intense heating.

In this arrangement it is also possible to heat the liquid to different temperatures in the two liquid chambers, for example by keeping a high temperature in the outer chamber the distillation may be further accelerated and completed. In this case two walls are preferably employed for the separation of the two liquid chambers, said walls being spaced a short distance from one another and leaving a narrow space between them. This space is secured against the entry of liquid, but is in communication with the vapour chamber of the distilling vessel. The high vacuum that is preferably maintained in the distilling vessel during distillation then also exists in the space between the two walls. This ensures good heat insulation of the inner chamber relatively to the outer liquid chamber.

However, it is also possible to make the distilling vessel of the invention still simpler. Accordingly, a further portion of the invention comprises eliminating the inner liquid chamber and providing the inner cylindrical wall of the annular distilling chamber with an inner base which lies above the level of the liquid, for example at a level midway in the distilling apparatus, and which closes the distilling chamber against the outside. This embodiment of the invention thus possesses only one liquid chamber, which is annular and in which a radially directed partition is disposed. In the proximity of the partition lies on one side the inlet for the liquid to be distilled, while on its other side is located the liquid outlet of the distilling vessel, so that here again the liquid has to flow around the distilling chamber. In order to prevent distillate condensing in the upper part of the distilling vessel from flowing down the walls of the latter and reuniting, near the outlet, with the liquid almost completely freed from the valuable substances to be distilled off, and to prevent the distillation residue from consequently leaving the distilling vessel mixed with some condensate, a built-in member is likewise provided in the vapour chamber of the distilling vessel, which here again consists substantially of an annular portion and a plate lying thereabove. The condensate is passed through the annular portion on to the inner base of the distilling vessel, which lies above the surface of the liquid. In order that the condensate may flow off from the inner base only at a suitable point, said base is in the form of a collecting vessel, the outlet of which lies above the point of entry of the liquid to be distilled into the vessel. The condensate thus unites only with the freshly introduced liquid, and the progress of the distillation is in no way disturbed by the more or less unavoidable condensation. In this way it is possible to perform the distillation solely with the aid of the annular liquid chamber and, in doing so, to render the distillation equally advantageous as in the case of the first-described embodiment of the invention, which, in addition to the annular liquid chamber, also possesses a second, inner liquid chamber.

In order more clearly to understand the nature of the invention, reference is made to the accompanying drawings, which illustrate diagrammatically and by way of example, two embodiments thereof, and in which:

Fig. 1 shows a vertical section through one embodiment of distilling vessel, the right-hand half of Fig. 1 being a section through C—D, and the left-hand half a section through the line E—F in Fig. 2;

Fig. 2 is a section through the line A—B in Fig. 1;

Fig. 3 shows a vertical section of a second embodiment of the invention, the right-hand side of the drawing being a section along the line L—M, and the left-hand side a section along the line G—H of Fig. 4; and Fig. 4 is a horizontal section along the line J—K in Fig. 3.

The liquid to be distilled is passed through the pipe 1 into the inner liquid chamber 2 of the distilling vessel. On the bottom of the distilling vessel, in the inner liquid chamber, lies the heating coil 3, which supplies the necessary heat. In this embodiment, the rising pipe 4 and the immersion pipe 5, surrounding the latter and extending downwards from the base of the distilling vessel, are provided for the purpose of moving the liquid to be distilled in the inner liquid chamber. By means of steam or of a suitable gas, which is admitted through the pipe 6 into the rising pipe, the liquid to be distilled is raised into the vapor chamber and deflected downwards again by a deflector plate 7 disposed at a suitable height above the rising pipe. Owing to the fact that the immersion pipe 5 extends down a certain distance below the distilling vessel, a greater liquid height, advantageous to effective circulation, is created in the rising pipe 4. The circulating device 4, 5, 6 may, however, be omitted altogether, or be replaced by other suitable circulating devices.

For example, instead of or in addition to the circulating device, a pipe spray 8 may be disposed on the base of the distilling vessel and be connected in suitable manner, by means of the connection piece 9, with a steam or gas supply pipe. The steam which flows through the pipe spray into the liquid produces at the same time an intensive movement, so that the liquid in the proximity of the heating coil 3 is constantly replaced and overheating of the liquid at the heating surfaces is avoided.

An automatically controlled inlet valve 10 is preferably mounted on the liquid inlet pipe 1, in order to admit as much liquid as is withdrawn by the distillation and through the outlet pipe and thus to keep the surface of liquid in the two liquid chambers constantly at the same level.

In the inner liquid chamber 2, a certain proportion, for example from 40 to 60%, of the distillable substances is constantly vaporised. The contents of the inner liquid chamber there have a considerably higher percentage of nondistillable substances than the freshly introduced liquid. During the distillation, a portion of this already partially distilled liquid flows out of the inner liquid chamber, through the aperture 11, into the outer liquid chamber 12. In the latter complete distillation is effected whilst the liquid is positively guided through the whole length of said chamber. Accordingly, the partition 13 is provided between the aperture 11 and the outlet 14 for the distillation residue. The partition prevents liquid from flowing directly from the aperture 11 to the outlet 14, which is located near the latter. The liquid entering at 11 therefore has to flow around the distilling chamber 12, in which are provided heating coils 15 for the supply of the required heat and, if desired, a spray pipe 16 for the admission of direct steam or other suitable gases. 17 is the connection of the spray pipe 16 to the steam pipe.

It is convenient to provide vertical guide plates 18 along the path of flow from 11 to 14, said plates having at the bottom an aperture 19 for the passage of the liquid. In this way a very even passage of the liquid through the outer liquid chamber is achieved. If the distillation requires a higher temperature in the outer liquid chamber 12 than in the inner liquid chamber, the working steam pressure of the outer heating coil 15 may be made higher than that of the inner coil 3. The partition 13 and the guide plates 18 may extend fairly high into the distilling chamber, so that the liquid is prevented from splashing over. 20 and 21 are connections of the heating coils to the steam pipe, and 22 and 23 are the condensate outlet pipes of the heating coils.

The outlet 14 preferably communicates with the inner liquid chamber through a pipe 24. When the cut-off member 25 in the outlet pipe is closed and the cut-off member 26 in the line 24 is opened, it is then possible to pass liquid from the outer liquid chamber back into the inner liquid chamber, the circulating device 4, 5, 6, delivering the liquid into the latter. If such a circulating device is not fitted, a different delivery device, for example a pump, may be provided in the pipe 24. Return of the liquid is convenient, for example, in order to bring the liquid present in the distilling vessel quickly to distillation temperature when starting up, or in order to treat completely the quantity of liquid still present in the distillation vessel when a continuously operated plant is closed down, so that said liquid contains no more substances desired to be distilled off. It may also serve to provide non-continuous or semi-continuous working, the liquid flowing off through 14, or a part thereof, being constantly sent back into the inner liquid chamber.

The wall between the inner and outer liquid chambers may, for example, consist of a cylinder welded on to the base of the distilling vessel with a liquid-tight join. In many cases it is convenient to provide two cylinders lying close to one another, a small distance being left between them. The two walls may then also be joined to the base of the distilling vessel with a liquid-tight join, for example by welding, so that the space between the two walls is closed against the liquid thereby and by a plate, or the like, welded on to both walls around the aperture 11. The two cylinders may also be joined together at the top. The space 27 is then connected to the vapour chamber of the distilling vessel through a curved pipe 28. As the distillation is generally carried out under a high vacuum, a high vacuum is thus also created in the space 27. The vacuum produces very good heat insulation between the inner and outer liquid chambers, which is important in those cases in which different temperatures are employed in the two chambers.

In the vapour chamber of the distilling vessel is located a built-in member comprising a top plate 29 and a lower annular fixture 30. The distillation vapours pass upwards through the opening in the fixture 30 between the guide plates 31, to be withdrawn in known manner to a condensation plant or the like. Entrained minute drops of liquid are separated on passing through the built-in member. On the walls of the upper part of the distilling vessel a larger or smaller part of the distillate vapours is usually condensed in consequence of loss of heat through the walls of the distilling vessel. The condensate is supplied to the inner liquid chamber by way of the annular fixture 30, so that it cannot hinder the distillation in the outer liquid chamber.

In the apparatus shown in Figs. 3 and 4, the liquid to be distilled is passed through the pipe 32 directly into the annular liquid chamber 33 of the distilling vessel, said chamber being formed by the outer wall 34 and the inner wall 35. At the top of the inner wall 35, i. e. midway up the distilling vessel, is joined the base 36, over which extends the ring 37, for example an extension of the inner wall 35.

The distilling vessel is heated either by the heating coils 38, to which the heating medium is supplied through the connection piece 39 and from which the condensate flows off at 40, or external heating of the vessel is provided, for example by means of fire gases. Spray pipes 41 may be provided, in order to introduce steam or other gas into the liquid and keep the latter in constant motion.

An automatically controlled inlet valve 42 is preferably mounted on the admission pipe 32, which is adapted to keep the level of liquid in the liquid chamber 33 constantly at the same height.

Distillation takes place while the liquid is compulsorily guided around the distillation chamber, which is accordingly sub-divided by the partition 45 between the mouth of the admission pipe 32 and the outlet 43.

Guide plates 44 are preferably fitted in the distillation chamber along the circular path of flow from 32 to 43, and are provided with an aperture 46 for the liquid, for example near the bottom. A throttle device 52 is preferably provided in the outlet 43.

Above the mouth of the admission pipe 32 discharging into the distillation chamber is fitted the outlet 47 of the condensate trap chamber formed above the inner base of the distillation chamber.

For the collection of the condensate forming in the upper part of the distilling vessel use is made of the annular fixture 48 and plate 49, the overlapping portions of which are joined by the guide plates 50 or the like. The distillate vapours flow up through the opening in the fixture 48 and the space between the guide plates 50, to be delivered through the outlet 51 of the distilling vessel to a per se known condensing apparatus, which is preferably so equipped that it creates as high as possible a vacuum in the distilling vessel.

This condensation apparatus, which may also be used with the apparatus of Figs. 1 and 2, consists, for example, of a condenser 63 for the distillate, which passes from the condenser through the passage 53 into the collecting chamber 54. 55 is a cooling agent feed and 56 the cooling agent discharge of the condenser 52. The uncondensed vapors, for example, water vapor, which has been passed in the apparatus to promote distillation, pass from the condenser 52, through the passage 57, and into the second condenser 58, in which they are precipitated. This condenser can be constructed in any desired manner, for example, as a spray condenser with barometric drop pipe or down passage 59. The cooling water is supplied thereto through the passage 60, and it is de-aerated in known manner through the air pump or the like 61, which is connected therewith by the passage 62.

The portion of the vapours that condenses on the upper walls of the distilling vessel is delivered as condensate through the annular fixture to the collector over the inner base of the distilling vessel and from there passes through the outlet 47 back into the liquid chamber of the distillation vessel, approximately to the point where the admission pipe 32 discharges into the liquid chamber.

In this apparatus also provision can be made for the return of the liquid flowing off to the inlet of the liquid chamber, which, for example, is accomplished by connecting the outlet pipe 43 with the admission pipe 32 and serves the same purposes as those mentioned in the foregoing in the explanation of the parts 14, 24, 25, 26 illustrated in Figs. 1 and 2.

I claim:

1. A distilling vessel, consisting of an annular distilling chamber which is formed by the outer wall of the distilling vessel and an inner upright cylindrical wall, said inner wall being joined at the bottom to the outer wall, the circular space surrounded by said inner wall being closed at the top by a circular floor, means for admitting liquid to the space surrounded by the inner wall, a radial partition in the distilling chamber, an inlet for the liquid to be distilled located on one side of and near the partition whereby, substantially the same liquid level is maintained at both the inside and outside of the cylindrical wall, an outlet for the distilled liquid located on the other side of and near the partition, means for heating the liquid in the distilling chamber, and means for conducting the vapours forming in the distilling vessel into a condensing plant working under a vacuum.

2. A distilling vessel, consisting of an annular distilling chamber, which is formed by the outer wall of the distilling vessel and an inner upright cylindrical wall, said inner wall being joined at the bottom to the outer wall, the circular space surrounded by said inner wall being closed at the top by a circular floor, means for admitting liquid to the space surrounded by the inner wall, a radial partition in the annular distilling chamber, an inlet for the liquid to be distilled located on one side of and near the partition whereby, substantially the same liquid level is maintained at both the inside and outside of the cylindrical wall, an outlet for the distilled liquid located on the other side of and near the partition, means for conducting the vapours forming in the distilling vessel into a condensing plant working under a vacuum, and heating devices disposed in the annular distilling chamber.

3. A distilling vessel, consisting of an annular distilling chamber, which is formed by the outer wall of the distilling vessel and an inner upright cylindrical wall, said inner wall being joined at the bottom to the outer wall, the circular space surrounded by said inner wall being closed at the top by a circular floor, means for admitting liquid to the space surrounded by the inner wall, a radial partition in the annular distilling chamber, an inlet for the liquid to be distilled located on one side of and near the partition whereby, substantially the same liquid level is maintained at both the inside and outside of the cylindrical wall, an outlet for the distilled liquid located on the other side of and near the partition, means for conducting the vapours forming in the distilling vessel into a condensing plant working under a vacuum, heating devices which are disposed in the annular distilling vessel, and means for passing water vapour through the liquid in the distilling vessel.

4. A distilling vessel, consisting of an annular distilling chamber which is formed by the outer wall of the distilling vessel and an inner upright cylindrical wall, said inner wall being joined at the bottom to the outer wall, the circular space surrounded by said inner wall being closed at the top by a circular floor, means for admitting liquid to the space surrounded by the inner wall, a radial partition in the annular distilling vessel, an inlet for the liquid to be distilled located on one side of and near the partition whereby, substantially the same liquid level is maintained at both the inside and outside of the cylindrical wall, an outlet for the distilled liquid located on the other side of and near the partition, means for conducting the vapours forming in the distilling vessel into a condensing plant working under a vacuum, heating devices which are disposed in the annular distilling vessel, devices for passing water vapour through the liquid in the distilling vessel, and means for returning condensate formed in the vapour chamber of the distilling vessel into the annular liquid chamber near the liquid inlet.

EMIL MORLOCK.